United States Patent
Schuerman et al.

(10) Patent No.: US 9,699,971 B2
(45) Date of Patent: Jul. 11, 2017

(54) MODIFIED SIEVE

(71) Applicant: Pape' Machinery, Inc., Eugene, OR (US)

(72) Inventors: Paul Schuerman, Colfax, WA (US); Jeffrey Solbrack, Colfax, WA (US)

(73) Assignee: PAPE' MACHINERY, INC., Eugene, OR (US)

(*) Notice: Subject to any disclaimer, the term of this patent is extended or adjusted under 35 U.S.C. 154(b) by 37 days.

(21) Appl. No.: 14/830,476

(22) Filed: Aug. 19, 2015

(65) Prior Publication Data
US 2016/0050849 A1    Feb. 25, 2016

Related U.S. Application Data

(60) Provisional application No. 62/039,657, filed on Aug. 20, 2014.

(51) Int. Cl.
*A01F 12/44* (2006.01)
*B07B 1/12* (2006.01)

(52) U.S. Cl.
CPC .............. *A01F 12/448* (2013.01); *B07B 1/12* (2013.01)

(58) Field of Classification Search
CPC ........ A01F 12/448; A01F 12/446; B07B 1/12; B07B 1/46
USPC ..... 460/101, 102; 209/309, 365.1, 395–396; 198/468.01
See application file for complete search history.

(56) References Cited

U.S. PATENT DOCUMENTS

| | | | | |
|---|---|---|---|---|
| 2,642,993 | A * | 6/1953 | Straley | A01F 12/446 209/398 |
| 3,385,438 | A * | 5/1968 | Fisher | B07B 1/46 209/394 |
| 6,056,639 | A * | 5/2000 | Gryspeerdt | A01F 12/44 460/101 |
| 6,579,172 | B2 * | 6/2003 | Lauer | A01D 41/1276 460/1 |
| 6,632,136 | B2 * | 10/2003 | Anderson | A01F 12/448 460/101 |
| 7,399,223 | B2 * | 7/2008 | Weichholdt | A01F 12/446 209/395 |
| 7,566,266 | B1 * | 7/2009 | Ricketts | A01F 12/32 460/101 |
| 7,997,967 | B2 * | 8/2011 | Ricketts | A01F 12/448 209/394 |
| 8,535,129 | B2 * | 9/2013 | Reiter | A01F 12/30 460/85 |

* cited by examiner

*Primary Examiner* — John G Weiss
(74) *Attorney, Agent, or Firm* — Timberline Patent Law Group

(57) ABSTRACT

Representative implementations of devices and techniques provide improved material flow for an agricultural vehicle, such as an overland combine harvester vehicle, for example. A sieve of the vehicle is modified with one or more baffles to reduce the quantity of harvested grain that is returned as tailings to the cleaning process during a harvesting pass.

20 Claims, 9 Drawing Sheets

A)

B)

--Prior Art--

A)

B)

A)

B)

MODIFIED SIEVE

PRIORITY CLAIM AND CROSS-REFERENCE TO RELATED APPLICATION

This application claims the benefit under 35 U.S.C. §119(e)(1) of U.S. Provisional Application No. 62/039,657, filed Aug. 20, 2014, which is hereby incorporated by reference in its entirety.

BACKGROUND

Various overland vehicles or implements that are configured for harvesting a grain crop, for example (such as combines, farming equipment, and the like) can also be configured for negotiating sloped terrain. The vehicle may include cleaning or separation components to perform the desired harvesting functions. Sometimes, the vehicle may make harvesting passes along a slope that runs uphill when traversing uneven terrain. In those cases, travelling uphill can cause a significant amount of the harvested crop to fall off the back of the vehicle's cleaning components where it may be combined with tailings, and reprocessed by the cleaning components. This can be a source of reduced material flow through the vehicle.

Harvested grain that is returned as tailings during a harvesting pass (and reprocessed by the cleaning process) can also tend to overload the cleaning components, often jamming the components. This can be a particular problem when the vehicle transitions from an uphill climb to the crest of a hill, and begins its descent. The additional grain combined with the tailings is then processed along with grain being harvested. Thus, making harvesting passes while traversing hilly or sloped terrain can cause inconsistent material flow through the cleaning components of the vehicle, and create problems such as jams.

Sometimes, an operator may attempt to modulate the speed of the vehicle during harvesting passes, based on whether the vehicle is ascending or descending a hill, or making a transition in the terrain. However, this can be very difficult to do, as well as being a fairly inefficient way to harvest a field. It can be difficult to accurately time speed increases and speed decreases with the changing terrain, and can be a burden on the operator over time. Further, attempts to regulate the speed of the vehicle may not be successful in preventing harvested grain from falling off the back of the cleaning components while the vehicle is ascending a steep incline.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions of components shown in the illustrations of the figures are for example and ease of discussion, and other shapes and or dimensions may be used and remain within the scope of the disclosure, unless specified otherwise.

FIG. 1 also includes a sample material flow map for the example vehicle.

DETAILED DESCRIPTION

Overview

Figure 1:
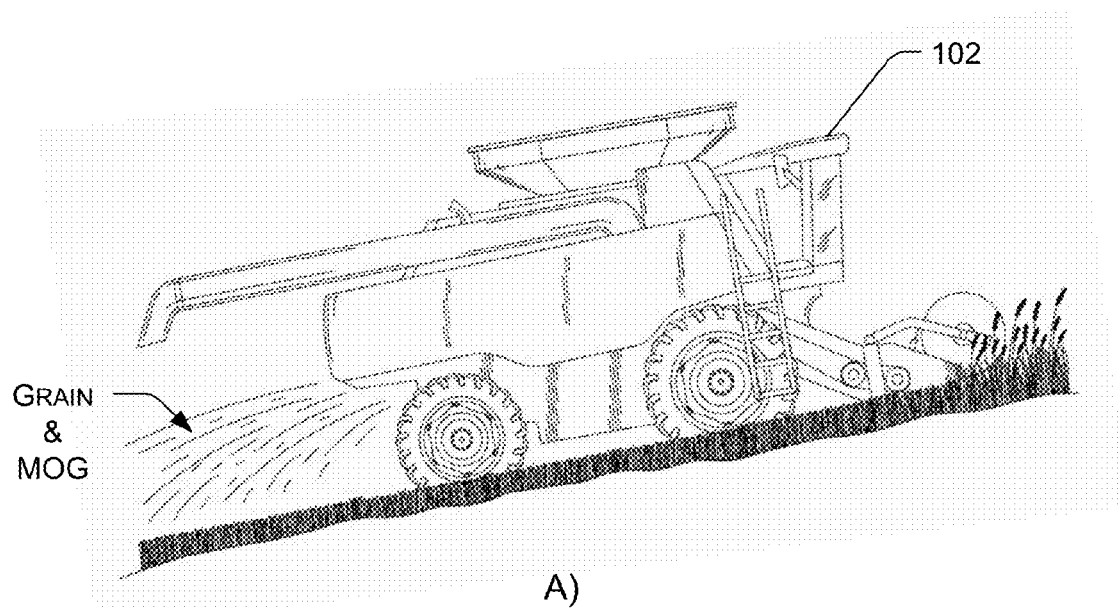
FIG. 1 includes an illustration of an example overland agricultural vehicle, such as a combine harvester, in which the techniques and devices in accordance with the present disclosure may be embodied.
Figure 1:
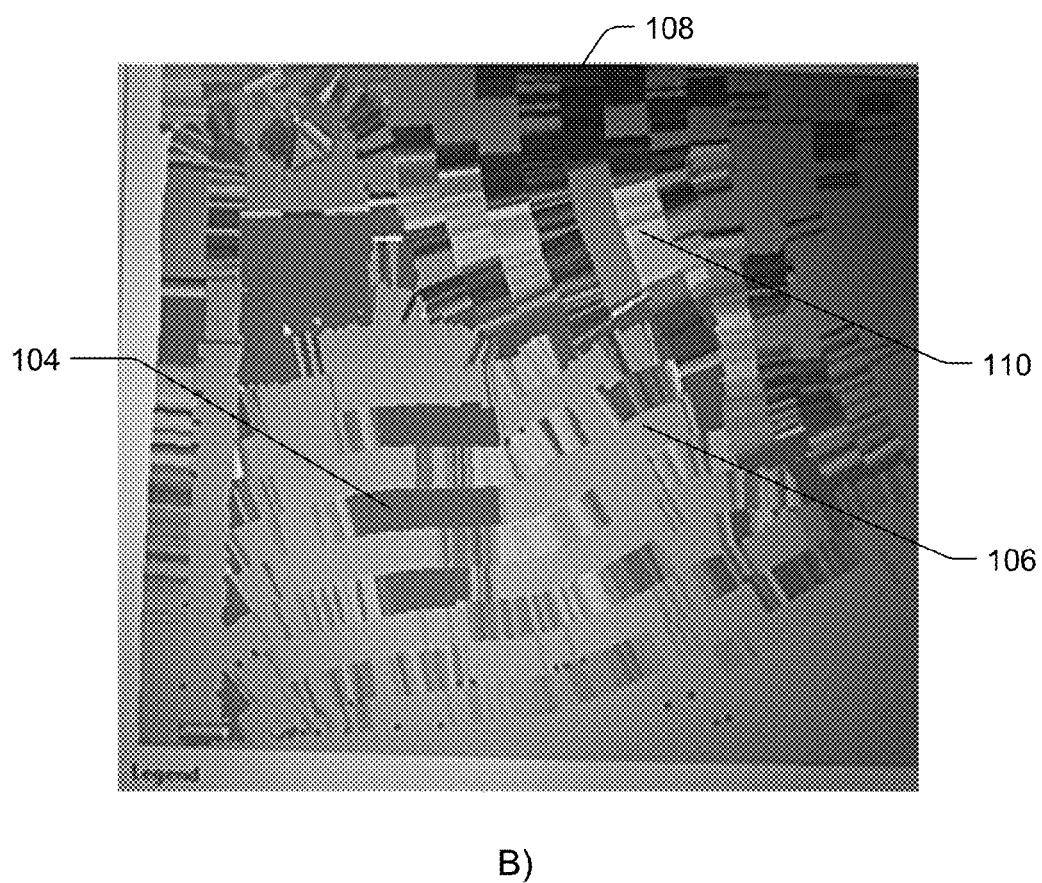

Representative implementations of devices and techniques provide improved material flow for an agricultural vehicle, such as an overland combine harvester vehicle. In an implementation, improved material flow includes improved grain flow within the combine harvester vehicle ("combine" or "vehicle") during harvest of a grain crop by the combine. For example, a sieve of the combine may be modified with one or more baffles (e.g., baffle louvers) to reduce the quantity of harvested grain that is returned as tailings during a harvesting pass (and reprocessed by the cleaning process), and to increase the quantity of harvested grain that is routed to the grain tank of the combine during the pass.

In one aspect, the combine vehicle is harvesting an uphill sloped terrain. In an implementation, harvested grain at the sieve is deflected by the baffle louver(s) and falls through the sieve, instead of moving off the back of the sieve and into the return tailings. The harvested grain that falls through the sieve collects in the grain tank of the combine during the uphill harvesting pass, instead of being reprocessed with the tailings during the uphill harvesting pass.

In various aspects, multiple adjustments may be made to the sieve and to the baffle louver(s) to improve the performance of the sieve during harvesting. For example, an angle of the sieve louvers may be adjusted to vary the size of the openings in the sieve. In an embodiment with one or more baffle louvers in place, the openings in the sieve may be adjusted to a smaller size to improve the quality (i.e., cleanness) of the crop in the grain tank without causing an increase in the quantity of grain being recycled with the return tailings. In the embodiment, the baffle louvers assist in routing the grain through the smaller openings in the sieve.

Further, an angle of the baffle louvers may be adjusted, a height or length of the baffle louvers may be varied, a size and/or shape of features of the leading edge of the baffle louvers may vary, a pitch of such features may vary, and the like. In various embodiments, the size, shape, configuration, mounting location, etc. of the baffle louvers may vary, and remain within the scope of the disclosure, providing the improved material flow.

In another aspect, one or more sieves or sieve components of an existing combine may be modified (e.g., retro-fit, etc.) to improve material flow through the combine. For example, an upgrade to include one or more baffle louvers on a sieve of an existing vehicle can be performed, including the use of many of the vehicle's existing components and assemblies. Alternately, a sieve of an existing combine may be removed and directly replaced by a modified sieve, without the necessity of modifying other components or systems of the combine.

Advantages of the disclosed techniques and devices are many, and include: 1) a more steady flow rate of material through the combine; 2) more accurate data on yield maps for prescription farming; 3) less potential for cleaning system overload, particularly within the tailings elevator system; and 4) the sieve can be operated more closed, with smaller openings, for a better quality crop yield in the grain tank. Other advantages may be present, some of them being recognized by a person having skill in the art.

Various implementations of devices and techniques for improved material flow are discussed in this disclosure. The devices and techniques are discussed with reference to example implementations illustrated in the figures. The devices and techniques discussed herein are referred to in the environment of an overland vehicle, such as a combine harvester vehicle, for ease of discussion and illustrative convenience. The devices and/or techniques may also be used in other environments, with other implementations, and associated with other vehicles, systems, processes, and the like, to provide improved material flow.

Implementations are explained in more detail below using a plurality of examples. Although various implementations and examples are discussed here and below, further implementations and examples may be possible by combining the features and elements of individual implementations and examples.

Example Environment

FIG. 1 includes an illustration (at "A") of an example overland agricultural vehicle 102, such as a combine harvester, in which the techniques and devices in accordance with the present disclosure may be embodied. It is to be understood that the techniques and/or devices may be implemented as part of the vehicle 102, as an accessory to the vehicle 102, or as part of another system (for example as a remote system (e.g., trailered system, etc.) to the vehicle 102, and so forth). Further, portions of a material flow system may be integrated with the vehicle 102 while other portions are remotely located.

The vehicle 102 of the figures and the disclosure is illustrated and discussed in generic terms and often described in terms of a "hillside combine harvester" vehicle. This is, however, for ease of discussion. The techniques and devices described herein with respect to material flow systems is not so limited, and may be applied to other types of vehicles (e.g., farming equipment, excavation equipment, construction equipment, military vehicles, etc.) without departing from the scope of the disclosure. Further, while the figures and the disclosure discuss the separation of a crop (such as "grain") from waste, the techniques and devices disclosed herein also apply to techniques and/or devices for separating other types of materials (e.g., soil, manufactured materials, etc.) that may be separated in like manner.

As shown in FIG. 1, the combine 102 may make harvesting passes along a slope that runs uphill. In general, the angle of the combine 102 as it travels uphill can cause a significant amount of the harvested crop ("grain") to fall off the back of the vehicle's cleaning components which are arranged to separate the grain from the waste, or "material other than grain" (MOG). This can be caused by a combination of gravity (due to the uphill angle), wind generated by the cleaning components, an angle of the louvers of the sieve, and so forth. When the grain falls off the back of the cleaning components, if it doesn't exit the vehicle 102, it is usually combined with tailings, and reprocessed by the cleaning components of the combine 102. If the combine 102 is still travelling uphill, the grain may continue to be recycled with the return tailings, instead of passing into the grain tank of the vehicle 102, which is arranged to hold harvested crop. This describes an example of reduced material flow.

FIG. 1 also includes a sample material flow map (at "B") for an example vehicle 102. The example material flow map illustrates example material flow within a combine 102 operating on varying sloped terrain. The shaded stripes on the map indicate harvesting passes of the vehicle 102 along the contours of the terrain. For example, the areas shown with medium-dark shading (indicated at 104 for example, as opposed to medium-light shading, indicated at 106 for example) are illustrative of an uphill pass for the combine 102. The medium-dark shading indicates a reduced material flow (with respect to optimal material flow) within the combine 102, as described above. For example, the medium-dark shading (at 104 for example) indicates a flow rate of from between 10 and 30 bushels to less than 10 bushels of grain per acre into the grain tank. Consequently, in most cases, much of the remainder of the harvested grain is recycling in the cleaning components of the combine 102, as described above, if not lost out the back of the vehicle 102, during an uphill pass.

As the combine 102 crests the slope, the areas shown in medium-light shading (indicated at 106 for example) are illustrative of a downhill pass for the combine 102. The medium-light shading indicates an increased material flow (with respect to optimal material flow) within the combine 102. In the case of an increased material flow, more grain than optimal is flowing through the cleaning components of the combine 102, which can result in overloading the cleaning components of the combine 102. For example, much of the grain that had been cycling with the tailings during the uphill pass may be dumped into the tailings elevator, potentially jamming the tailings elevator, or other cleaning components. As an example, the medium-light shading (at 106 for example) indicates a flow rate of more than 110 bushels of grain per acre into the grain tank. Additionally, the darkest shading (at 108 for example) indicates between 90 and 110 bushels of grain per acre into the grain tank. Consequently, at these higher flow rates, the potential for the cleaning components of the vehicle 102 to become overloaded is increased.

In various implementations, an improved material flow through the combine 102 comprises a steady flow of grain through the combine 102 at a more optimal flow rate, during harvesting passes on all types of terrain (including uphill and downhill passes). For example, optimal material flow (e.g., between 50 to 70 bushels/acre) is indicated on the map of FIG. 1(B) by the lightest shading, shown at 110, for example. Additionally, variations of the lightest shading may indicate flow rates of 30 to 50 bushels/acre and 70 to 90 bushels/acre. In an ideal scenario, the passes indicating a reduced material flow (e.g., at 104) and the passes indicating an increased material flow (e.g., at 106 and 108) on the material flow map would instead be replaced by passes indicating an improved material flow (e.g., at 110) and a greater efficiency of the combine 102. In alternate implementations, the optimum material flow rate of a vehicle 102 (or other material processing/cleaning system) may comprise less than 50 to 70 bushels per acre or greater than 50 to 70 bushels per acre. In any case, a reasonably consistent and predictable material flow rate through the vehicle 102 or system is generally desired.

Figure 2:
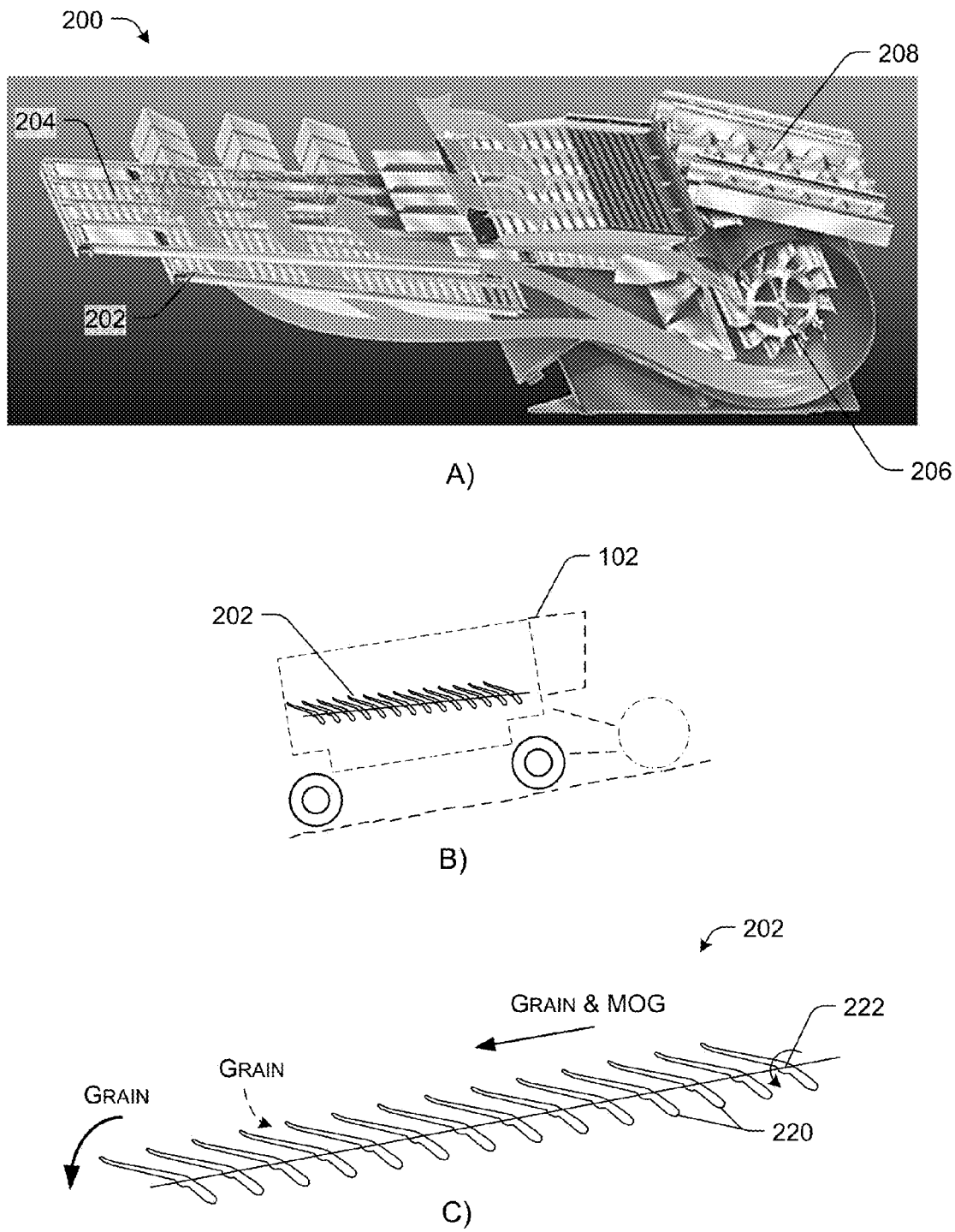
FIG. 2 includes diagrams showing example details of a cleaning shoe and a sieve of the example vehicle of FIG. 1.

FIG. 2 includes diagrams showing details of example cleaning components of the vehicle 102, including a cleaning shoe 200 and a sieve 202 of the example combine 102. For example, a cleaning shoe 200 may include at least one sieve 202 and at least one chaffer 204. In an example, the sieve 202 may have smaller openings than the chaffer 204, for a staged cleaning process. In the example, a combination of grain and MOG enters the cleaning shoe 200, while the chaffer 204 and the sieve 202 are shaking (generally in opposite directions). The smaller portions, such as the grain, fall through the chaffer 204 and the sieve 202, and the MOG exits out the back of the vehicle 102.

In an example, as shown in FIG. 2(A), a cleaning shoe 200 may include a fan 206 to generate wind or air currents used to separate harvested seed or grain from MOG. The air currents are channeled to flow upwards through the sieve 202 and the chaffer 204. Often, the air currents are used in conjunction with shaking the materials as they are collected by the combine 102. The denser grain falls through the chaffer 204 and sieve 202, into the hoppers or grain tank, and the less dense MOG is blown out of the vehicle 102.

In an example, the grain and MOG enter the cleaning shoe 200 area via one or more augers 208. The grain and MOG are propelled onto the cleaning components with the aid of the air currents from the fan 206. FIG. 2(B) shows an example of the general location and orientation of the cleaning components, including the sieve 202, within an example combine 102, as it traverses an uphill slope.

In various examples, as shown in the detail of FIG. 2(C), the sieve 202 is comprised of multiple adjustable louvers 220. In the examples, the louvers 220 are arranged to pivot at an attachment point 502, to change an angle of the louvers 220, and thereby change a size of the openings of the sieve 202. As shown in the diagrams of FIG. 2, the grain and MOG are introduced to the sieve 202 by coming through openings in the chaffer 204. Referring to FIG. 2(C), when the vehicle 102 is harvesting in an uphill path, the grain may have a tendency to exit the back of the sieve 202 and combine with tailings, as indicated by the solid arrows, instead of falling through the openings in the sieve 202, as indicated by the dashed arrow.

Figure 3:
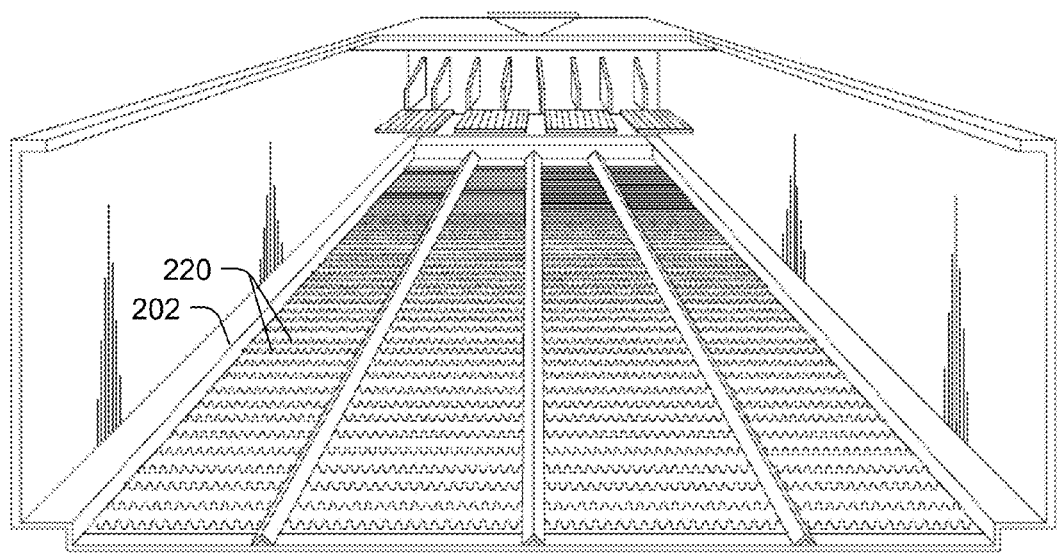
FIG. 3 includes two illustrations showing an example sieve in operation.
Figure 3:
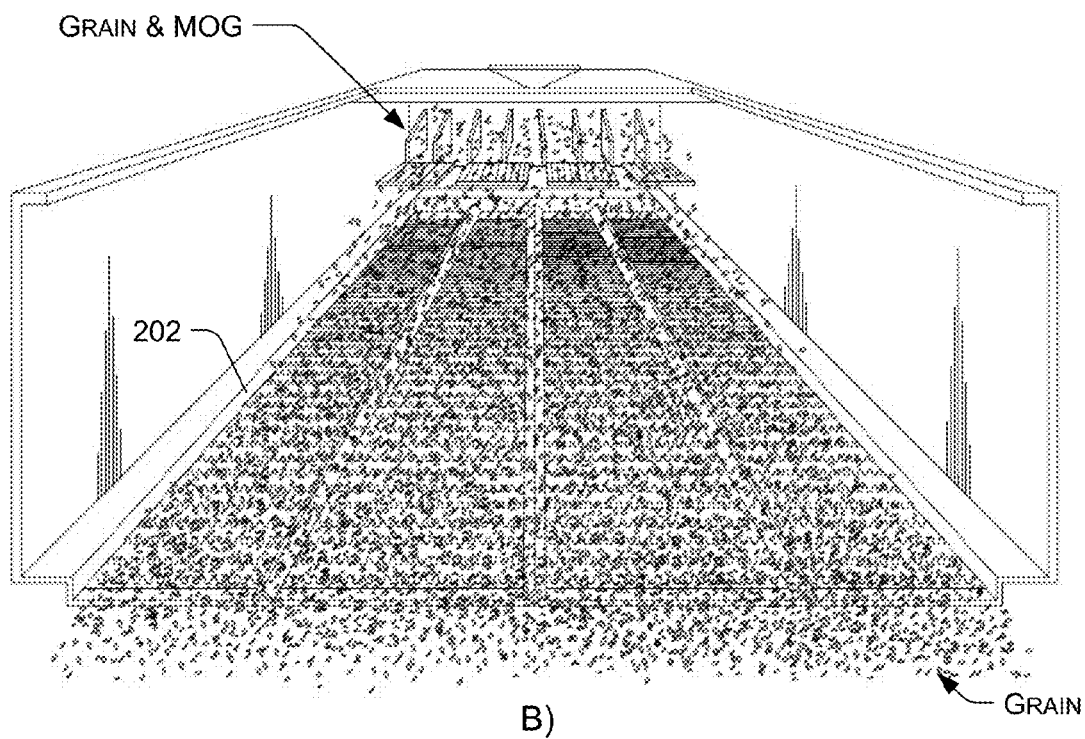

FIG. 3 includes two illustrations (at "A" and "B") showing an example sieve 202 in operation. The sieve 202 is located within the combine 102, as illustrated in FIG. 2(B), for example. In the photos, the chaffer 204 is not shown, for better clarity of the sieve 202. The louvers 220 of the sieve 202 are the most visible in the illustration of FIG. 3(A).

FIG. 3(A) shows a view of the sieve 202 prior to the materials being introduced to the sieve 202. In FIG. 3(B), grain is introduced to the sieve 202, due to the air currents resulting from the fan 206 and via the augers 208, and the sieve 202 begins to shake forward and backward. In an example, it is assumed that grain and some MOG have passed through the chaffer 204, to the sieve 202. Generally, the openings in the chaffer 204 are larger than the openings in the sieve 202, for staged cleaning of the grain crop. Consequently, some MOG is assumed to pass through the chaffer 204 as well as grain.

It can be seen in FIG. 3(B) that much grain is falling off the back of the sieve 202. In various examples, two to three times more grain may fall off the back of the sieve 202 when the vehicle 102 is traversing an uphill slope than when the vehicle 102 is level. Grain that falls off the back of the sieve 202 is generally recycled through the cleaning process with the tailings (including grain still in the husk needing re-threshing). This includes being reintroduced to the chaffer 204 and the sieve 202 via a tailings elevator. Grain that falls through the openings in the sieve 202 is stored in the grain tank of the vehicle 102 as clean grain.

Example Embodiments

Figure 4:
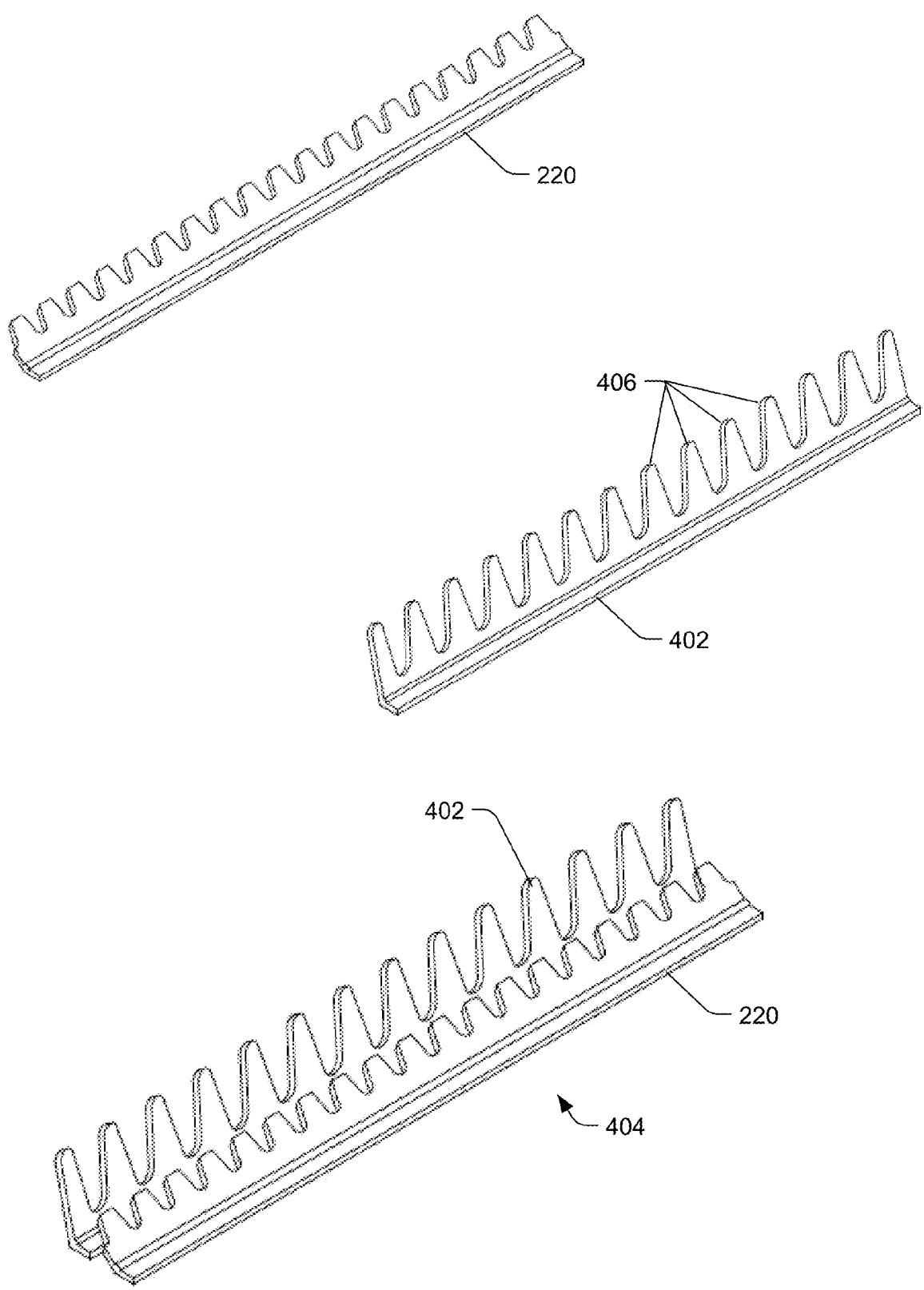
FIGS. 4 and 5 are a series of illustrations showing various views of an example sieve louver, an example baffle louver, an example modified sieve louver (formed from a sieve louver and a baffle louver), and a modified sieve (including one or more modified sieve louvers), according to various embodiments.
Figure 5:
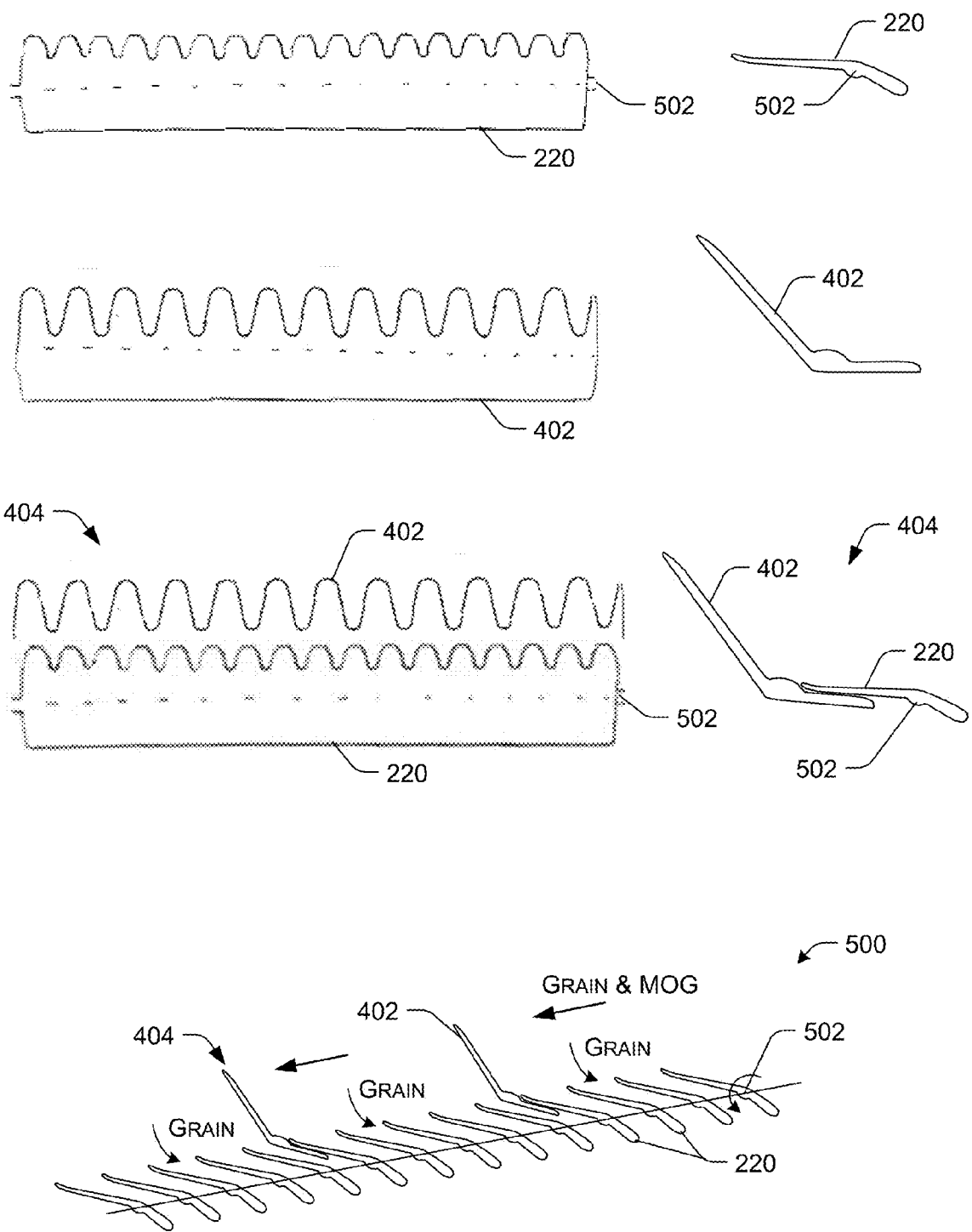

FIGS. 4 and 5 include perspective views (FIG. 4) and profile and side (e.g., cross-section) views (FIG. 5) of an example sieve louver 220, an example baffle louver 402, and an example modified sieve louver 404, (formed by combining a sieve louver 220 with a baffle louver 402), according to various embodiments. Further, an example modified sieve 500 (including one or more modified sieve louvers 404) is shown at FIG. 5. In the examples shown, the louvers (220, 402, and 404) have characteristic shapes and bend angles, as shown in the illustrations. The shapes and bend angles shown are not intended to be limiting, and in various embodiments, the louvers (220, 402, and 404) may have other shapes and/or bend angles.

For example, detail of a sieve louver 220 is shown in FIGS. 4 and 5, with the sieve louver 220 out of the sieve 202. In various implementations, as shown in FIGS. 4 and 5, the sieve louver 220 may include a contoured or serrated edge, so as to form adjustable openings when multiple sieve louvers 220 are combined in a sieve 202. As seen in FIG. 5, the sieve louver 220 includes a pivot 502, which allows the sieve louver 220 to be rotated, adjusting an angle of the sieve louver 220 with respect to the sieve 202. Adjusting the angle of multiple sieve louvers 220 with respect to the sieve 202 increases or decreases the gap between the sieve louvers 220 while in the sieve 202, and thus the size of the openings in the sieve 202.

An example of a baffle louver 402 is shown in FIGS. 4 and 5, according to an embodiment. In various implementations, the baffle louver 402 is shaped to redirect, deflect, inhibit, etc. the flow of material within the cleaning shoe 200, without preventing the flow of the material. For example, in the implementations, one or more baffle louvers 402 are located within the sieve 202 to redirect the flow of grain with respect to the sieve 202. In some examples, the baffle louver(s) 402 are arranged to reduce or prevent grain from falling off the back of the sieve 202 when the vehicle 102 is traversing an uphill slope. In the examples, the baffle louver(s) 402 may facilitate the clean grain falling through the openings in the sieve 202 instead.

In various embodiments, the baffle louver(s) 402 may be shaped in numerous configurations as desired. For example, the baffle louver(s) 402 may be shaped to include one or more features 406 on a leading edge (e.g., an edge presented to the flow of material) of the baffle louver(s) 402. For example, the baffle louver(s) 402 may include fewer or more features 406, at varying intervals or pitches. Further, the features 406 may be in any shape desired to produce the desired material deflection. For example, the features 406 may be longer or shorter, wide or narrow, bent, curved, or flat, sharp or blunt, rounded or pointed, or a combination of multiple shapes. In one example, as shown in FIGS. 4 and 5, the baffle louver 402 resembles a toothed comb, where each tooth (i.e., feature 406) has a contoured shape. In different examples, the features 406 may include various contours arranged to assist in redirecting the flow of material.

In an alternate embodiment, the baffle louver 402 includes a single feature 406, arranged across a part of the length of the baffle louver 402, or across the entire the length of the baffle louver 402. In other words, in the embodiment, the feature 406 comprises a single solid baffle, across the length of the baffle louver 402 or across a portion of the length of the baffle louver 402. In the example, the baffle louver 402 comprises a rigid or semi-rigid blank structure (e.g., rigid section of sheet metal, fiberglass, polymer, formed metal, or the like).

In one implementation, the baffle louver 402 comprises a chaffer 204 louver. In the implementation, a louver from a chaffer 204 is mounted in the sieve 202, and arranged as a baffle louver 402. In other implementations, the baffle louver 402 is comprised of other components. For example, a baffle louver 402 may be formed from sheet metal, molded from a metal, fiberglass, or other stiff material that can be formed in a desired shape and size, or the like.

In an embodiment, as shown in FIGS. 4 and 5, an example modified sieve louver 404 is formed from combining a sieve louver 220 with a baffle louver 402. In the embodiment, the baffle louver 402 is coupled to the sieve louver 220 (by spot welding, rivets, bolts, screws, etc.) so that the features 406 of the baffle louver 402 extend beyond the leading edge of the sieve louver 220. In various implementations, the baffle louver 402 may be coupled to the sieve louver 220 at different positions to achieve a desired overall configuration or shape of the modified sieve louver 404.

In an alternate implementation, the baffle louver 402 may be combined with a blank structure that is representative of a sieve louver 220 to form the modified sieve louver 404. In other words, the baffle louver 402 may be coupled to a blank structure, having a similar size as a sieve louver 220, coupled in like manner as the baffle louver 402 is coupled to the sieve louver 220 as shown in FIGS. 4 and 5 and described herein, to form the modified sieve louver 404. The sieve louver 220 portion of the modified sieve louver 404 need not be an actual sieve louver 220, but can be a rigid or partially rigid structure performing the same functions as the sieve louver 220 in FIGS. 4 and 5, that is supporting the baffle louver 402 in a desired position within the sieve 202 or 500. In various embodiments, the blank structure may be comprised of sheet metal, formed metal, fiberglass, polymer, composite, or the like.

In one example, as shown in FIG. 5, the modified sieve louver 404 is arranged to pivot (at point 502) with respect to the sieve 202 or 500. In the example, the baffle louver 402 pivots with the sieve louver 220 when the modified sieve louver 404 pivots with respect to the sieve 202, changing the angle of the baffle louver 402 with respect to the sieve 202 or 500.

Figure 6:
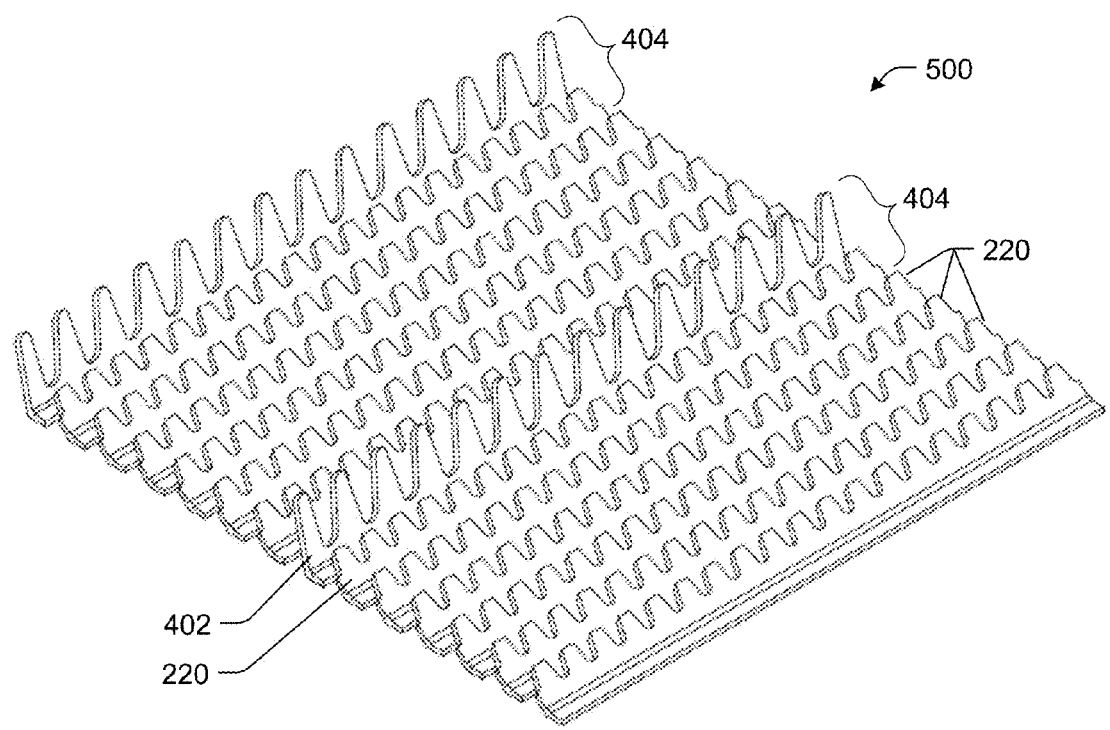
FIG. 6 is an illustration of a portion of an example modified sieve, having multiple modified sieve louvers, according to an embodiment.

FIGS. 5 and 6 include illustrations of a portion of an example modified sieve 500, having multiple modified sieve louvers 404, according to an embodiment. For example, in one implementation, the modified sieve 500 comprises one or more baffle louvers 402 coupled to existing sieve louvers 220 of the sieve 202. In another example, as shown in FIG. 6, the modified sieve 500 is comprised of a number of adjustable sieve louvers 220 and one or more modified sieve louvers 404 (comprising a baffle louver 402 coupled to a sieve louver 220). In the illustrations shown in FIGS. 5 and 6, two modified sieve louvers 404 are included in the modified sieve 500. In various implementations, a modified sieve 500 may include few or many modified sieve louvers 404, as desired. The modified sieve louvers 404 may be spaced or arranged within the sieve 202 in a regular formation or a random pattern.

As discussed above, with reference to FIG. 2, the grain and MOG are introduced to the modified sieve 500 by coming through openings in the chaffer 204. Referring to FIG. 5, when the vehicle 102 is harvesting in an uphill path, the grain may be deflected or redirected by the baffle louvers 402 (and/or modified sieve louvers 404), and fall through the openings in the modified sieve 500, as indicated by the solid curved arrows. This is in contrast to the grain exiting the back of the sieve 202 and combining with tailings, as previously discussed with an unmodified sieve 202 (shown in FIG. 2).

In an example, as shown in FIG. 5, the sieve louvers 220 and modified sieve louvers 404 are arranged to pivot at an attachment point 502, to change an angle of the louvers (220, 404) with respect to the modified sieve 500. In an example, the operator may adjust the angle of the louvers (220, 404) with respect to the modified sieve 500 to adjust the size of the openings in the modified sieve 500. In an implementation, the openings in the modified sieve 500 may be adjusted to be smaller than openings in the unmodified sieve 202 for a similar harvesting pass. In an implementation, the modified sieve 500 may be adjusted to have smaller openings without loss of grain to the grain tank, even when harvesting on an uphill slope. In an example, the openings in the modified sieve 500 may be set to 4-5 millimeters, in contrast to openings set at 7 millimeters for the stock sieve 202, for the same grain, for an equivalent uphill pass.

In various implementations, a modified sieve 500 may include modified sieve louvers 404 and/or baffle louvers 402 at regular intervals (for example, 7 sieve louvers 220 followed by 1 modified sieve louver or baffle louver 402, or the like). In other implementations, baffle louvers 402 or modified sieve louvers 404 may be located within a modified sieve 500 at irregular intervals corresponding to a desired material deflection or redirection result.

In an alternate implementation, one or more partial baffle louvers 402 or partial modified sieve louvers 404 may be located in strategic positions within a modified sieve 500. For example, a partial louver (402, 404) may include one with fractional length, height, or the like, as compared to a sieve louver 220 or a full baffle louver 402 or full modified sieve louver 404. In various implementations, the use of sieve louvers 220, baffle louvers 402, modified sieve louvers 404, or partial forms of the same, may be arranged in a modified sieve 500 to create a desired material flow pattern.

Figure 7:
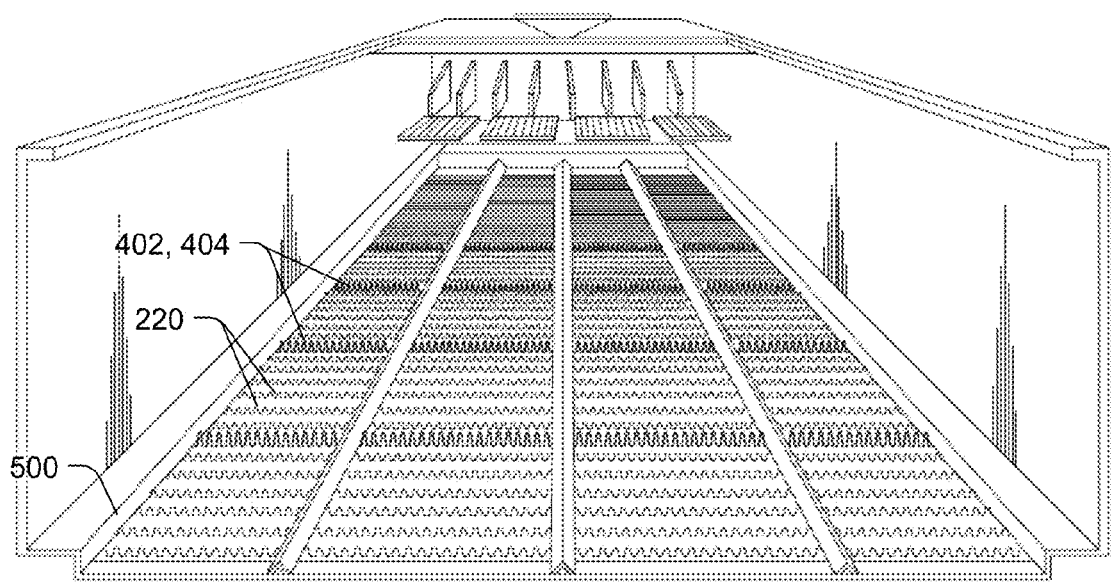
FIG. 7 includes two illustrations showing an example modified sieve in operation, according to an embodiment.
Figure 7:
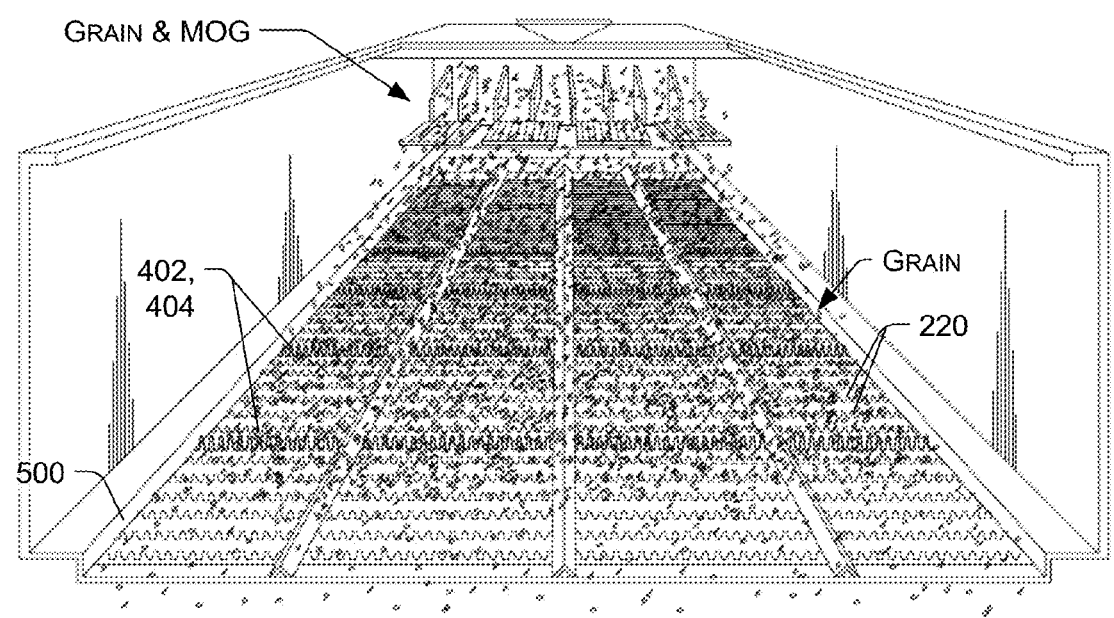

FIG. 7 includes two illustrations showing an example modified sieve 500 in operation, according to an embodiment. The modified sieve 500 is located within the vehicle 102 in the same position as the sieve 202. In an implementation, the modified sieve 500 is replaced for the sieve 202. In the illustrations, the chaffer 204 is not shown, for better clarity of the modified sieve 500. The louvers (220, 402, and 404) of the modified sieve 500 are the most visible in the illustrations of FIG. 7(A).

FIG. 7(A) shows a view of the sieve 202 prior to the materials being introduced to the modified sieve 500. In FIG. 7(B), grain is introduced to the modified sieve 500, due to the air currents resulting from the fan 206 and via the augers 208, and the modified sieve 500 begins to shake forward and backward. In an example, it is assumed that grain and some MOG have passed through the chaffer 204, to the modified sieve 500. Generally, the openings in the chaffer 204 are larger than the openings in the modified sieve 500, for staged cleaning of the grain crop. Consequently, some MOG is assumed to pass through the chaffer 204 as well as grain. However, the modified sieve 500 may be adjusted with small openings to allow grain to pass through the modified sieve 500 and for MOG to exit the vehicle 102.

It can be seen in FIG. 7(B) that less grain is falling off the back of the modified sieve 500, and more grain is falling into the openings between the sieve louvers 220, than with the stock sieve 202 (at FIG. 3). As shown in FIG. 7, the flow of the grain is redirected by the baffle louvers 402, and much of the grain remains within sections or portions of the modified sieve 500 formed by the baffle louvers 402. As the modified sieve 500 shakes, the grain that is kept back by the baffle louvers 402 falls through the openings in the modified sieve 500 and into the grain tank as clean grain.

In various examples, 35% to 40% more grain may fall through the openings in the modified sieve 500 and into the grain tank when the vehicle 102 is traversing an uphill slope (e.g., approximately a 21% grade) than when using an unmodified sieve 202. More grain into the grain tank means less grain that is recycled through the cleaning process with the tailings, and less potential for jamming the cleaning components on the uphill runs. Further, the use of the modified sieve 500 improves material flow and efficiency, creating a more steady flow of grain through the combine 102 during harvesting passes on differing slopes of terrain.

Figure 8:
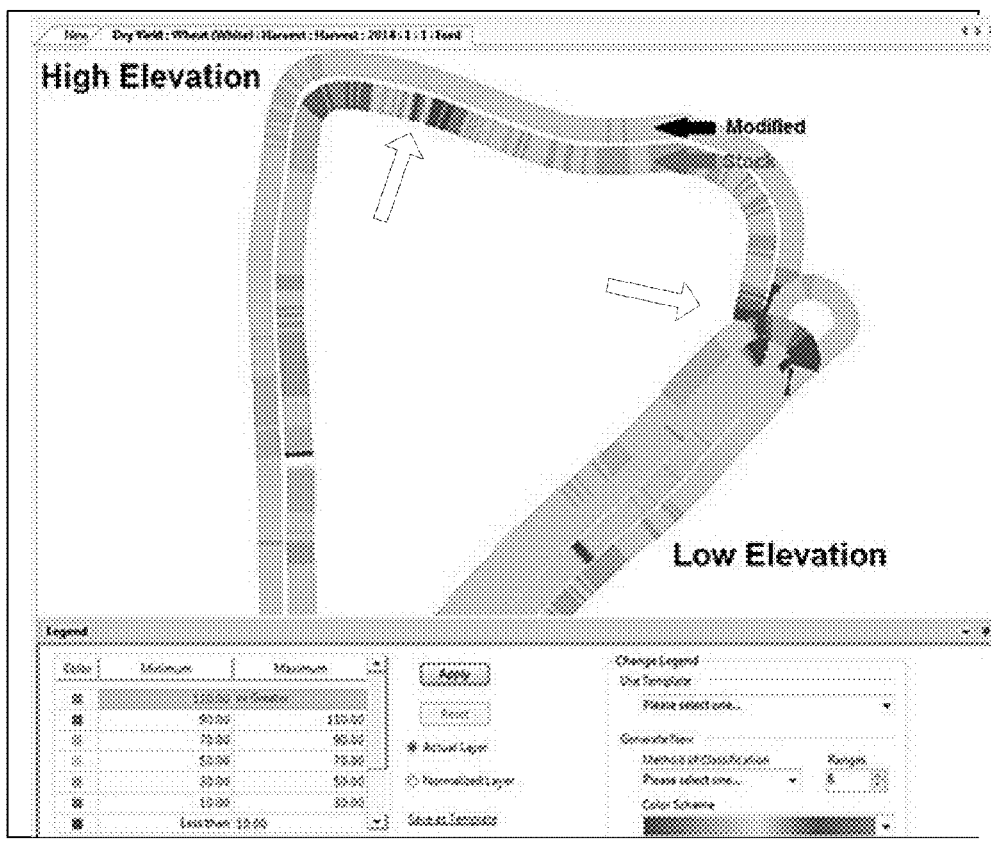
FIG. 8 shows two example material flow maps for example vehicles, according to an embodiment. In each material flow map, two vehicles are represented—one vehicle having a stock sieve and one vehicle having a modified sieve.
Figure 8:
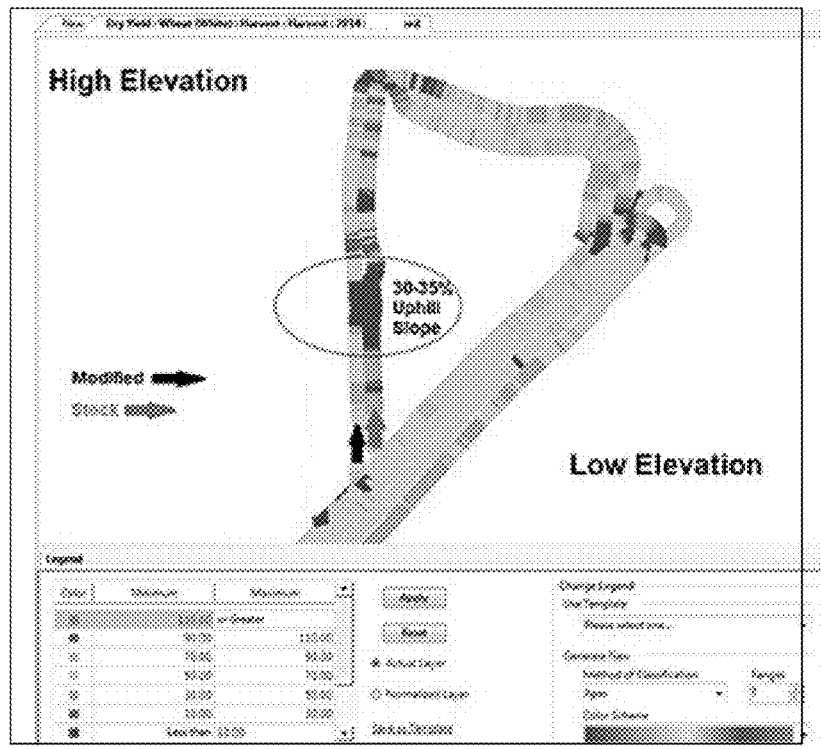

FIG. 8 shows two example material flow maps for example vehicles 102, according to an embodiment. In each material flow map, two vehicles 102 are represented—one vehicle 102 having a stock sieve 202 and one vehicle 102 having a modified sieve 500. On both flow maps, the flow patterns show more uniform material flow (as indicated by the variations in the shaded paths for each vehicle 102) on the vehicle 102 with the modified sieve 500.

On both maps of FIG. 8, the vehicle 102 with the modified sieve 500 has an improved material flow as compared to the vehicle 102 having the stock sieve 202 at the uphill and downhill slopes of the harvested terrain. For example, arrows are placed on the map of FIG. 8(A) at the uphill portions of the terrain, which show greatly reduced material flow for the stock vehicle 102 (e.g., darker shaded portions than the corresponding area for the modified vehicle 102) and improved material flow (less variation in shading) for the vehicle 102 with the modified sieve 500. Also, the vehicle 102 with a modified sieve 500 shows improved material flow at the downhill portions as well (indicated on the map by less variations in shaded portions throughout the map).

It is noted that the lower map represents an extreme uphill slope (30% to 35% grade) which represents the limits of some vehicle's climbing ability. The material flow performance of the vehicle 102 with the modified sieve 500 is improved over the stock vehicle 102 even at this extreme slope (indicated on the map by shorter and fewer variations in shaded portions).

In various implementations, the techniques and devices discussed, including using a modified sieve 500, may be configured to be added or refit to an existing vehicle 102, to provide improved material flow to the vehicle 102. In other words, one or more baffle louvers 402 may be retro-fitted to one or more sieve louvers 220 of an existing vehicle 102. In one example, an existing sieve 202 may be removed from a vehicle 102, and a modified sieve 500 replaced in the original location of the sieve 202.

In an implementation, the modified sieve 500 may be retro-fitted (e.g., kitted or field-installed) to a sieve 202 of a vehicle 102 while maintaining many or all of the cleaning components and/or original hardware. For example, one or more baffle louvers 402 can be coupled to existing sieve louvers 220, or one or more sieve louvers 220 can be replaced by modified louvers 404 in a sieve 202, to provide improved material flow to the existing vehicle 102. In other words, a modified sieve 500 may be formed from an existing sieve 202 without the necessity of modifying other components or systems of the combine 102.

Representative Process

Figure 9:
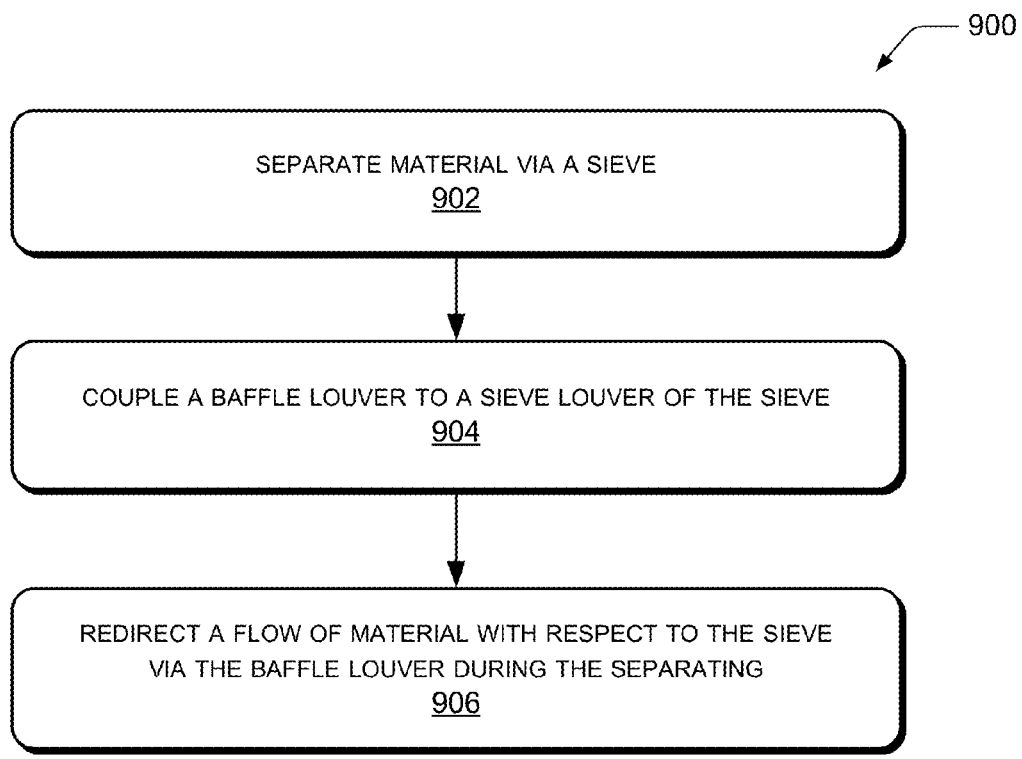
FIG. 9 is a flow diagram illustrating an example process for improving material flow of an agricultural vehicle, according to an implementation.

FIG. 9 illustrates a representative process 900 for implementing techniques and/or devices relative to improving material flow through a vehicle (such as vehicle 102, for example). The process 900 may include modifying a sieve of the vehicle (such as with baffle louvers 402 and/or modified louvers 404, for example), or replacing the sieve of the vehicle with a modified sieve (such as modified sieve 500, for example). The example process 900 is described with reference to FIGS. 1-8.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 902, the process includes separating material (such as grain from MOG, for instance) via a sieve (such as a sieve 202 or a modified sieve 500, for example). At block 904, the process includes coupling a baffle louver (such as baffle louver 402, for example) to a sieve louver of the sieve. In an embodiment, this comprises forming a modified sieve louver.

For example, the process includes modifying one or more sieve louvers by coupling a baffle louver to each sieve louver to form one or more modified sieve louvers. In an implementation, the process includes replacing one or more sieve louvers of the sieve with a corresponding quantity of modified sieve louvers. In one example, the process includes locating the one or more modified sieve louvers within the sieve according to a predetermined pattern. In another example, the modified sieve louvers are located within the sieve according to a random arrangement.

At block 906, the process includes redirecting a flow of material with respect to the sieve via the baffle louver during the separating. In an implementation, the process includes redirecting harvested grain through the sieve via the one or more modified louvers (or the baffle louvers) during a harvesting pass.

In an example, the process includes reducing a quantity of harvested grain that is returned as tailings during a harvesting pass and increasing a quantity of the harvested grain that is routed to a grain tank during the harvesting pass. In the example, the harvesting pass includes traversing uphill or downhill terrain having a grade of at least 20%.

In an implementation, the process includes reducing an opening size of the sieve when operating the sieve on a slope, and capturing a greater quantity and quality of desired material during the separating.

In one implementation, the process includes retrofitting an existing harvesting vehicle by locating one or more baffle louvers and/or modified sieve louvers within the sieve of the existing vehicle, to provide improved material flow to the harvesting vehicle.

In alternate implementations, other techniques may be included in the process in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the disclosed techniques, systems, and devices. Further, individual features of various embodiments may be combined to form other embodiments not specifically described.

What is claimed is:

1. A modified sieve louver for a harvesting vehicle, comprising:
   a sieve louver having a first length; and
   a substantially planar baffle louver having a length equal to the first length coupled to a trailing edge of the sieve louver.

2. The modified sieve louver of claim 1, wherein the baffle louver is shaped to redirect, deflect, or inhibit a flow of material with respect to a cleaning shoe of the harvesting vehicle, without preventing the flow of the material.

3. The modified sieve louver of claim 1, wherein the baffle louver is shaped to redirect harvested grain through a sieve of the harvesting vehicle during an uphill harvesting pass, the baffle louver having a cross-sectional profile substantially equal to a cross-sectional profile of the sieve louver, oriented vertically flipped with respect to the sieve louver.

4. The modified sieve louver of claim 1, wherein the baffle louver comprises a louver taken from a chaffer of the harvesting vehicle, the louver having a substantially equal and opposite profile to the sieve louver and an extended trailing edge with respect to the sieve louver.

5. The modified sieve louver of claim 1, wherein at least one of the sieve louver and the baffle louver comprises a blank structure.

6. A modified sieve for a harvesting vehicle, comprising:
   a plurality of sieve louvers, each sieve louver having a cross-sectional profile of a first obtuse angle; and
   one or more modified sieve louvers, each modified sieve louver comprising a sieve louver with a substantially planar baffle louver coupled to the sieve louver, the baffle louver having a cross-sectional profile of a second obtuse angle substantially equal to the first obtuse angle and vertically flipped with respect to the sieve louver, the one or more modified sieve louvers arranged with the baffle louver angled opposing material flow to deflect or redirect material flow with respect to the modified sieve.

7. The modified sieve of claim 6, wherein the baffle louver is coupled to an underside of a trailing edge of the sieve louver, the baffle louver having a length substantially equal to a length of the sieve louver.

8. The modified sieve of claim 6, wherein the one or more modified sieve louvers are arranged in a regular interval with respect to the plurality of sieve louvers.

9. The modified sieve of claim 6, wherein the one or more modified sieve louvers are arranged in a random arrangement with respect to the plurality of sieve louvers.

10. The modified sieve of claim 6, wherein the modified sieve louvers are arranged to pivot at an attachment point within the sieve, to change an angle of the modified sieve louvers with respect to the modified sieve.

11. The modified sieve of claim 10, wherein changing an angle of the modified sieve louvers with respect to the modified sieve changes a size of the openings of the modified sieve.

12. The modified sieve of claim 11, wherein the openings of the modified sieve may be adjusted to be smaller than openings in an unmodified sieve for a similar harvesting pass without a reduction in harvested grain, including while harvesting on an uphill slope.

13. A method of improving material flow, comprising:
    separating material via a sieve;
    coupling a substantially planar baffle louver to a sieve louver of the sieve, the baffle louver and the sieve louver having cross-sectional profiles of substantially equal obtuse angles, the baffle louver having a vertically flipped orientation with respect to the sieve louver when the baffle louver is coupled to the sieve louver;
    arranging the baffle louver at an angle opposing a flow of material over the sieve; and
    redirecting the flow of material with respect to the sieve via the baffle louver during the separating.

14. The method of claim 13, further comprising:
    reducing an opening size of the sieve when operating the sieve on a slope; and
    capturing a greater quantity and quality of desired material during the separating.

15. The method of claim 13, further comprising modifying one or more sieve louvers by coupling a baffle louver having a length equal to a length of the sieve louvers to a trailing edge of the one or more sieve louvers to form one or more modified sieve louvers, and replacing one or more sieve louvers of the sieve with a corresponding quantity of modified sieve louvers.

16. The method of claim 15, further comprising locating the one or more modified sieve louvers within the sieve according to a predetermined pattern.

17. The method of claim 15, further comprising redirecting harvested grain through the sieve via the one or more modified louvers during a harvesting pass.

18. The method of claim 13, further comprising reducing a quantity of harvested grain that is returned as tailings during a harvesting pass and increasing a quantity of the harvested grain that is routed to a grain tank during the harvesting pass.

19. The method of claim 18, wherein the harvesting pass includes traversing uphill or downhill terrain having a grade of at least 20%.

20. The method of claim 13, further comprising retrofitting an existing harvesting vehicle by locating one or more baffle louvers and/or modified sieve louvers within the sieve, to provide improved material flow to the harvesting vehicle.

* * * * *